US008077197B2

(12) United States Patent
Ohtomo et al.

(10) Patent No.: US 8,077,197 B2
(45) Date of Patent: Dec. 13, 2011

(54) THREE-DIMENSIONAL DATA PREPARING METHOD AND THREE-DIMENSIONAL DATA PREPARING DEVICE (75) Inventors: Fumio Ohtomo, Itabashi-ku (JP); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 1430 days.

(21) Appl. No.: 11/598,498

(22) Filed: Nov. 13, 2006

(65) Prior Publication Data

US 2007/0115354 A1    May 24, 2007

(30) Foreign Application Priority Data

Nov. 24, 2005 (JP) ................................. 2005-339532

(51) Int. Cl.
H04N 7/18 (2006.01)
G01C 17/00 (2006.01)
(52) U.S. Cl. .......................... 348/135; 702/150; 702/152
(58) Field of Classification Search .............. 348/42–60, 348/135–142; 702/150–154
See application file for complete search history.

(56) References Cited

U.S. PATENT DOCUMENTS

| 5,166,878 A | 11/1992 | Poelstra |
| 6,097,337 A * | 8/2000 | Bisio ........................ 342/357.31 |
| 6,611,664 B2 * | 8/2003 | Kochi et al. .................... 396/324 |
| 7,552,025 B2 * | 6/2009 | Ohtomo et al. ................ 702/150 |
| 2003/0160757 A1 * | 8/2003 | Shirai et al. ................... 345/156 |
| 2004/0076340 A1 | 4/2004 | Nielsen |
| 2005/0062869 A1 * | 3/2005 | Zimmermann et al. ....... 348/335 |
| 2006/0239539 A1 * | 10/2006 | Kochi et al. .................... 382/154 |
| 2007/0025595 A1 * | 2/2007 | Koizumi et al. ............... 382/103 |
| 2007/0081695 A1 * | 4/2007 | Foxlin et al. ................... 382/103 |

FOREIGN PATENT DOCUMENTS

| JP | 11-211473 A | 8/1999 |
| JP | 2000-275013 A | 10/2000 |
| JP | 2001-317915 | 11/2001 |
| JP | 2002-501349 A | 1/2002 |
| JP | 2004-317237 A | 11/2004 |
| JP | 2005-91298 A | 4/2005 |
| WO | 99/35855 A1 | 7/1999 |

OTHER PUBLICATIONS

Notice of Allowance, with English translation, dated Jul. 5, 2011 in corresponding Japanese Patent Application No. 2005-339532.

* cited by examiner

Primary Examiner — Brendan Higa
(74) Attorney, Agent, or Firm — Nields, Lemack & Frame, LLC (57) ABSTRACT A 3-dimensional data preparing method, comprising a first step of continuously taking digital images when moving from a first known point, via a second known point, to a third unknown point, a second step of generating tracking points from an image acquired at the first point, and sequentially specifying the tracking points on the continuously acquired images, a third step of obtaining 3-dimensional data of the tracking points based on the first and second points, a fourth step of sequentially obtaining a position of the third point, based on the orientation and the position data of the tracking point, a fifth step of obtaining position data of an image based on the first and second points, and a sixth step of sequentially obtaining position data of images from the orientation of the images at the second and third points and from the position data at those points.

6 Claims, 7 Drawing Sheets

——— METHOD OF INTERSECTION
---------- METHOD OF RESECTION

THREE-DIMENSIONAL DATA PREPARING METHOD AND THREE-DIMENSIONAL DATA PREPARING DEVICE

BACKGROUND OF THE INVENTION

The present invention relates to a 3-dimensional data preparing method and a 3-dimensional data preparing device using GPS (Global Positioning System), in case position measurement by GPS cannot be successfully achieved.

In recent years, position measurement using GPS has been increasingly propagated. For example, In case that civil engineering work is carried out by using civil engineering construction machine such as bulldozer, the working position, i.e. the position of the bulldozer, is determined, and the like, by a GPS position detecting device, and the working position is confirmed. Or, an electronized map information as in a car navigator is linked with position data of a mobile object obtained by the GPS position detecting device, and the present position is reflected on an electronic map and is turned to an image, and the present position is displayed, and the like, on an image display device. In this way, it is possible to measure the position of a mobile object at real time.

In case that civil engineering work is carried out by a civil engineering construction machine, it is preferable to obtain 3-dimensional data of the working position or 3-dimensional data of a scheduled working position to match the construction data for the purpose of carrying out civil engineering work with high accuracy.

Under such condition that the image processing technique is progressing and that capacity of the storage device is becoming larger, there are now strong demands on 3-dimensional display of topography and scenes to facilitate more visual judgment for the function of electronic map. Also, it is now wanted to acquire images with 3-dimensional data in easier manner and in large amount as map data.

However, electric wave from satellite is used in the position measurement by GPS. The electric wave from the satellite is interrupted by an obstacle, e.g. by a mountain, a building, etc., and then, there is a place (a shade) where electric wave does not reach. Therefore, in the place of the shade, position measurement cannot be performed by GPS.

In the past, for the place or the section where position measurement cannot be performed by GPS, it was necessary to stop the operation and to be performed surveying operation by human power using conventional type surveying instrument.

Or, as the map data of the place of shade, only image data without position data and/or planar image data can be acquired. There have been inconveniences that, for instance, electronic map cannot be displayed, and the like, by continuous 3-dimensional image.

SUMMARY OF THE INVENTION

It is an object of the present invention to provide a 3-dimensional data preparing device and 3-dimensional data preparing method, by which it is possible to perform continuous position measurement even at a place of shade where electric wave from satellite is interrupted by using a single GPS position detecting device, also not to interrupt position measurement, and to acquire a large amount of continuous 3-dimensional data and images with 3-dimensional data. Also, it is possible to prepare 3-dimensional data from continuous images acquired during moving even when the position detecting device is not provided.

To attain the above object, the present invention provides a 3-dimensional data preparing method, which comprising a first step of continuously taking digital images of scenes in the surrounding when moving from a first point, which is a known point, via a second point, which is a known point, to a third point, which is an unknown point, a second step of generating tracking points from an image acquired at the first point, and sequentially specifying the tracking points by the pursuit of the points generated on the continuously acquired images, a third step of obtaining 3-dimensional data of the tracking points based on the result of orientation of the tracking points at the first point and the second point and from position data of the first point and the second point, a fourth step of sequentially obtaining a position of the third point, i.e. an unknown point, based on the result of orientation of the tracking point acquired at the third point and based on 3-dimensional position data of the tracking point, a fifth step of obtaining 3-dimensional position data of an image including the tracking point from the result of orientation of the images including the tracking points at the first point and at the second point and from the position data at the first point and at the second point, and a sixth step of sequentially obtaining 3-dimensional position data of images including the tracking points from the result of orientation of the images including the tracking points at the second point and at the third point and from the position data at the second point and at the third point. Also, the present invention provides the 3-dimensional data preparing method as described above, wherein position data are measured by a GPS position detecting device and turned to know at least on the first point and at the second point. Further, the present invention provides the 3-dimensional data preparing method as described above, wherein position data of the tracking point is obtained from the known data at the first point and at the second point by the method of intersection, and position data of the third point is obtained from 3-dimensional position data of the tracking point in the image by the method of resection. Also, the present invention provides the 3-dimensional data preparing method as described above, wherein images in a plurality of directions are continuously acquired, and the tracking points are generated in images at least in one direction.

Also, the present invention provides a 3-dimensional data preparing device, comprising an image pickup device for continuously taking digital images of scenes in the surrounding in a process to move from a first point, which is a known point, via a second point, which is a known point, to a third point, which is an unknown point, a direction sensor for detecting image pickup direction of the image pickup device, and a data processing preparation unit for generating a tracking point from an image acquired at the first point, for sequentially specifying the tracking point from pursuit of the points generated in the images continuously acquired, for obtaining 3-dimensional position data of the tracking points from result of orientation of the tracking point at the first point and at the second point and from position data of the first point and the second point, for sequentially obtaining the third point, which is an unknown point, from result of orientation of the tracking points acquired at the third point and from 3-dimensional position data of the tracking points, for obtaining 3-dimensional position data of an image including the tracking points from result of orientation of an image including the tracking points at the first point and at the second point and from position data of the first point and the second point, and for sequentially obtaining 3-dimensional position data of an image including the tracking points from orientation result of images including the tracking points at the second point and the third point and from position data of the second point and the third point. Also, the present invention provides the 3-dimensional data preparing device as described above, further comprising a GPS position detecting device, wherein the known data of the first point and the second point are measured by the GPS position detecting device. Further, the present invention provides the 3-dimensional data preparing device as described above, comprising a total circumferential mirror and image correcting means, wherein the image pickup device can take images in total circumferential direction in horizontal direction via the total circumferential mirror, and the image correcting means corrects the images taken.

The present invention provides a 3-dimensional data preparing method, comprising a first step of continuously taking digital images of scenes in the surrounding when moving from a first point, which is a known point, via a second point, which is a known point, to a third point, which is an unknown point, a second step of generating tracking points from an image acquired at the first point, and sequentially specifying the tracking points by the pursuit of the points generated on the continuously acquired images, a third step of obtaining 3-dimensional data of the tracking points based on the result of orientation of the tracking points at the first point and the second point and from position data of the first point and the second point, a fourth step of sequentially obtaining a position of the third point, i.e. an unknown point, based on the result of orientation of the tracking point acquired at the third point and based on 3-dimensional position data of the tracking point, a fifth step of obtaining 3-dimensional position data of an image including the tracking point from the result of orientation of the images including the tracking points at the first point and at the second point and from the position data at the first point and at the second point, and a sixth step of sequentially obtaining 3-dimensional position data of images including the tracking points from the result of orientation of the images including the tracking points at the second point and at the third point and from the position data at the second point and at the third point. As a result, it is possible to prepare an image with 3-dimensional data for a third point and the subsequent points if position data are available for the first point and for the second point at least at the time to start the measurement.

Also, the present invention provides the 3-dimensional data preparing method as described above, wherein position data are measured by a GPS position detecting device and turned to know at least on the first point and at the second point. Thus, individual measurement operation to obtain the known data at the first point and at the second point can be eliminated, and the image with 3-dimensional data can be prepared promptly for arbitrary time, for arbitrary point, and for arbitrary range as desired.

Further, the present invention provides the 3-dimensional data preparing method as described above, wherein position data of the tracking point is obtained from the known data at the first point and at the second point by the method of intersection, and position data of the third point is obtained from 3-dimensional position data of the tracking point in the image by the method of resection. As a result, it is possible to prepare an image with 3-dimensional data on continuous images acquired without comprising a position measuring device.

Also, the present invention provides a 3-dimensional data preparing device, comprising an image pickup device for continuously taking digital images of scenes in the surrounding in a process to move from a first point, which is a known point, via a second point, which is a known point, to a third point, which is an unknown point, a direction sensor for detecting image pickup direction of the image pickup device, and a data processing preparation unit for generating a tracking point from an image acquired at the first point, for sequentially specifying the tracking point from pursuit of the points generated in the images continuously acquired, for obtaining 3-dimensional position data of the tracking points from result of orientation of the tracking point at the first point and at the second point and from position data of the first point and the second point, for sequentially obtaining the third point, which is an unknown point, from result of orientation of the tracking points acquired at the third point and from 3-dimensional position data of the tracking points, for obtaining 3-dimensional position data of an image including the tracking points from result of orientation of images including the tracking points at the first point and at the second point and from position data of the first point and the second point, and for sequentially obtaining 3-dimensional position data of an image including the tracking points from orientation result of images including the tracking points at the second point and the third point and from position data of the second point and the third point. Thus, if position data on the first point and the second point are available at least at the time to start the measurement, it is possible to prepare an image with 3-dimensional data of the third point and the subsequent points, and the image with 3-dimensional data can be prepared on the continuous images acquired even when the position measuring device is not provided.

Further, the present invention provides the 3-dimensional data preparing device as described above, comprising a GPS position detecting device, wherein the known data of the first point and the second point are measured by the GPS position detecting device. This makes it possible to eliminate individual measurement operation to obtain the known data at the first point and at the second point, and it is possible to promptly prepare an image with 3-dimensional data for arbitrary time, for arbitrary point, and for arbitrary range as desired.

Also, the present invention provides the 3-dimensional data preparing device as described above, comprising a total circumferential mirror and image correcting means, wherein the image pickup device can take images in total circumferential direction in horizontal direction via the total circumferential mirror, and the image correcting means corrects the images taken. As a result, it is possible to acquire image data for wide range associated with the position data by a single image pickup device.

DETAILED DESCRIPTION OF THE PREFERRED EMBODIMENT

Description will be given below on the best aspect for carrying out the present invention referring to the attached drawings.

According to the present invention, continuous images are acquired from a mobile object while performing position measurement of the mobile object, and 3-dimensional data is associated with the image acquired.

First, description will be given on a 3-dimensional data preparing device 1 of the present invention by referring to FIG. 1 and FIG. 2.

Figure 1:
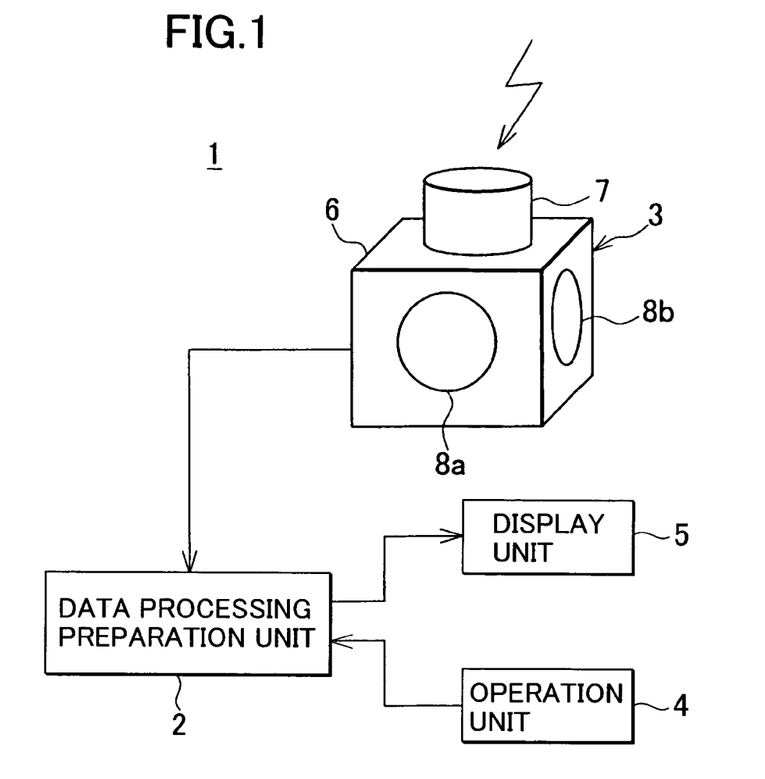
FIG. 1 is a schematical drawing to show a position measuring device according to an embodiment of the present invention.

FIG. 1 shows general features of a 3-dimensional data preparing device 1. The 3-dimensional data preparing device 1 primarily comprises a data processing preparation unit 2, a position detecting sensor 3, an operation unit 4, and a display unit 5. The position detecting sensor 3 is installed at a position with good outlook on a mobile object 9 such as a roof above driver's compartment of an automobile, a bulldozer, etc. The data processing preparation unit 2, the operation unit 4, and the display unit 5 are operated by an operator or a driver, and the data processing preparation unit 2, the operation unit 4, and the display unit 5 are installed at a position visually recognizable such as driver's compartment. The operation unit 4 is designed as a touch panel and may be integrated with the display unit 5.

Figure 2:
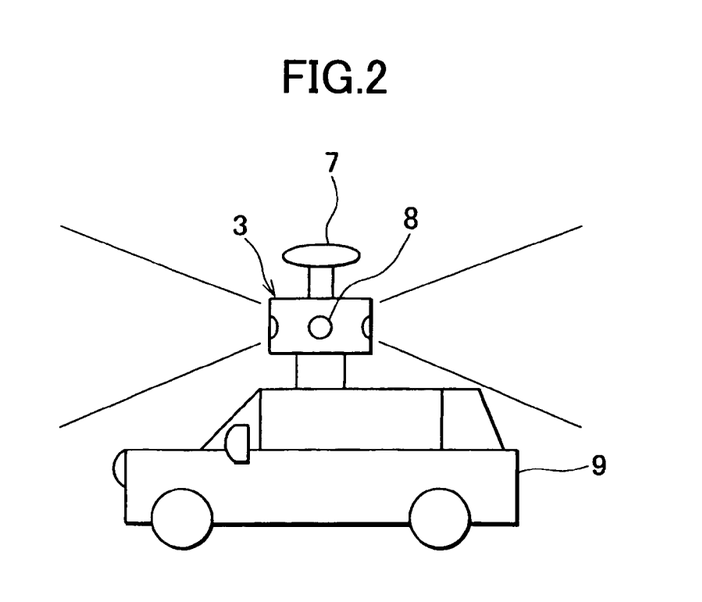
FIG. 2 is a drawing to explain an aspect for carrying out the embodiment of the present invention.

FIG. 2 shows a case where the position detecting sensor 3 is installed on a roof of an automobile as an example of the mobile object 9.

The position detecting sensor 3 comprises a GPS position detecting device 7 installed on upper surface of a sensor main unit 6, image pickup device 8a, image pickup device 8b, image pickup device 8c and image pickup device 8d (hereinafter generally referred to as "image pickup device 8"), which can output the picked-up image as digital image data, such as digital cameras mounted on side surfaces of the sensor main unit 6 and facing in 4 directions, and an azimuth sensor 10 (see FIG. 3). The image pickup device 8 comprises image pickup elements containing a multiple of pixels such as CCD sensor, CMOS sensor, etc. One frame of image data consists of an aggregation of signals of the image pickup elements. By specifying the image pickup element to match the signal, a position in the image can be specified. Also, mechanical relation between the image pickup device 8 and the azimuth sensor 10 is fixed. When azimuth is detected by the azimuth sensor 10, image pickup direction (azimuth) of each image pickup device 8 can be uniquely determined.

Figure 3:
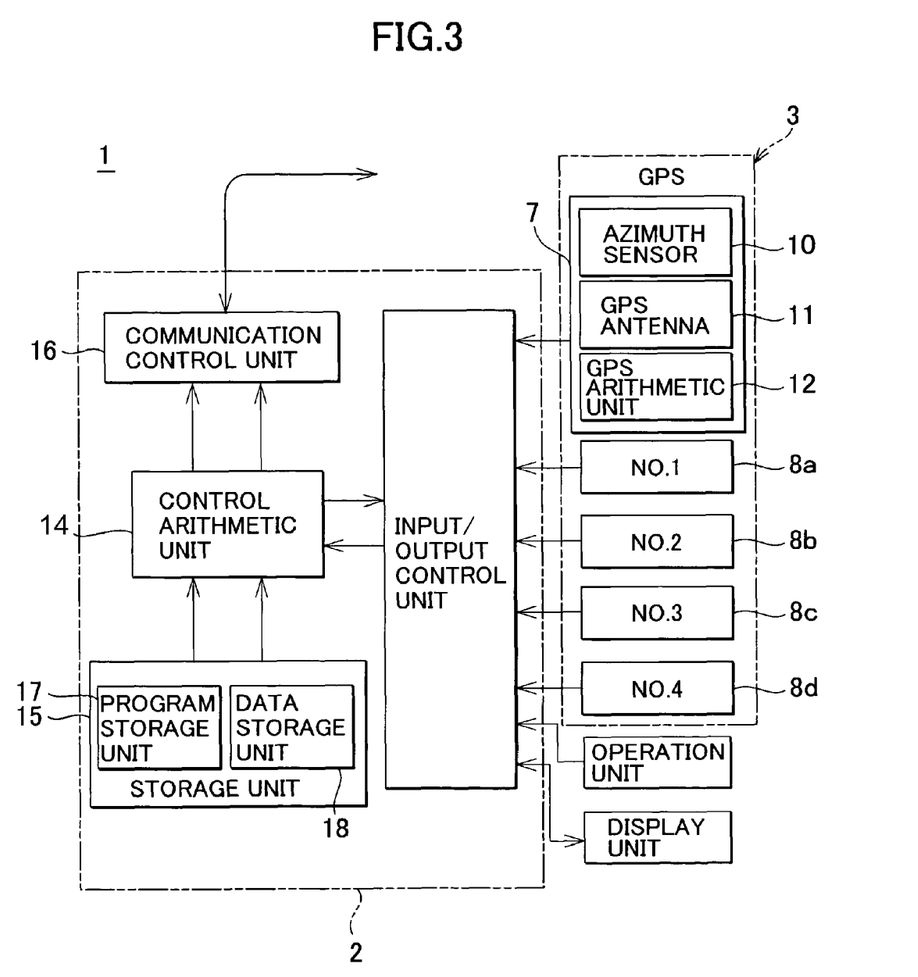
FIG. 3 is a schematical block diagram of a position measuring device according to an embodiment of the present invention.

The GPS position detecting device 7 comprises a GPS antenna 11 and a GPS arithmetic unit 12 (see FIG. 3). Signals from a plurality of satellites are received by the GPS antenna 11. Based on the received signals, the GPS arithmetic unit 12 calculates a distance between the satellite and the receiving point according to 3-dimensional geometry, and 3-dimensional position measurement is performed. As the position measurement, single position measurement, interference position measurement, etc. are known. It is preferable to adopt RTK (real-time kinematic) position measurement, by which it is possible to perform position measurement within short time and while moving.

By the image pickup devices 8, it is possible to acquire images over the total circumference. To match image pickup angle (image pickup range) of the image pickup device 8, 3 or 5 or more of image pickup devices 8 are installed. One image pickup device 8 may be rotated in horizontal direction, and images may be taken for each rotation angle as required, and the scenes over the total circumference can be acquired by the image pickup devices 8.

Or, two image pickup devices 8 may be provided so that the scenes in two directions perpendicularly crossing the advancing direction of the mobile object 9 can be taken. In this case, the image pickup angle may be within an adequate range, and the image pickup angle does not need to be 180°.

The image pickup device 8a, the image pickup device 8b, the image pickup device 8c and the image pickup device 8d take images with a predetermined time interval in synchronization with each other. Position measurement by the GPS position detecting device 7 is performed in synchronization with the image pickup or in synchronization with a time interval required times as long as the image pickup time interval. An image data of the pickup image and a position data obtained by the position detecting sensor 3 when the image is taken are sent to the data processing preparation unit 2 described later. In the time interval of image pickup of the image pickup device 8, the latest taken image and the current taken image are superimposed on each other, and the time interval of image pickup is such a time interval that continuity is not impaired between the images taken. When the mobile object 9 moves at high speed, the time interval should be shortened. When the mobile object 9 moves at lower speed, the time interval may be longer. The time interval for the image pickup may be fixed to match the maximum speed of the mobile object 9. The time interval of the image pickup may be set up to match the maximum speed of the mobile object 9, and the image data to be sent to the data processing preparation unit 2 may be adjusted to match the speed and may be thinned out.

Now, description will be given on the data processing preparation unit 2 by referring to FIG. 3.

The data processing preparation unit 2 generally comprises an I/O control unit 13, a control arithmetic unit 14 represented by CPU, a storage unit 15, a communication control unit 16, etc.

As the storage unit 15, memory card, HD, FD, MO, etc. may be used. These are provided as a built-in component or in removable type. The storage unit 15 has a program storage area 17 and a data storage area 18. In the program storage area 17, the following programs are stored: a sequence program for controlling operation of the device, an image processing program for extracting a tracking point from the acquired image, a calculation program for performing image matching between a plurality of images and for tracking the tracking point between a plurality of images, a surveying program for calculating a position of an unknown point in the image by the method of intersection according to two 3-dimensional position data obtained by the position detecting sensor 3 and for calculating a position of the position detecting sensor 3 by the method of resection at least at two known points in two images respectively, a transmission control program for transmitting the measurement results obtained to an external device such as data collecting device, and a display program for displaying the results of position measurement on the display unit 5.

In the data storage area 18, the image data acquired at the image pickup device 8 and position data of the position detecting sensor 3 when the image data have been taken are stored. The position data is associated with the image data, and the image data are the data of time series.

The communication control unit 16 is used to control transmission and receiving of data when data are given and taken to and from an external data processing device, e.g. a personal computer.

Description will be given on operation by referring to FIG. 4 to FIG. 8.

Figure 4:
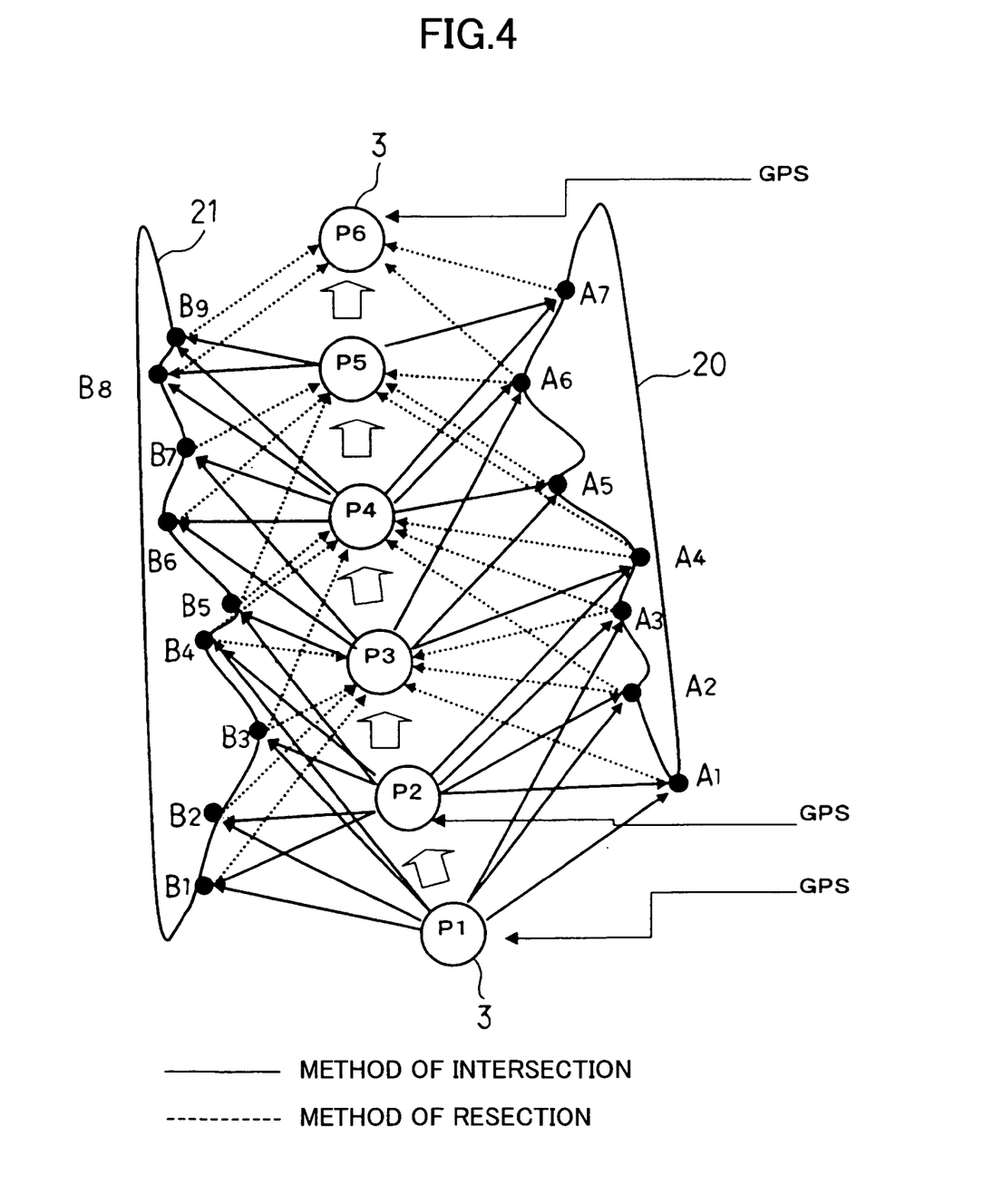
FIG. 4 shows a condition of measurement in the embodiment of the present invention.

FIG. 4 shows a condition where the mobile object 9 advances between an obstacle 20 and an obstacle 21 and the position detecting sensor 3 moves from a first point (measuring point P1) to a sixth point (measuring point P6) (hereinafter, the measuring point P is briefly referred as "P"). At P1 and P2, signals from satellite can be received by the GPS antenna 11. At P3 to P5, signals from satellite cannot be received due to the obstacles 20 and 21. At P6, signals from satellite can be received again.

As for P1 and P2, position measurement may be made—not through position detection by GPS—but by other measuring device, and P1 and P2 may be regarded as the known points. Based on P1 and P2 set up as the known points, 3-dimensional data preparation may be started.

During the moving of the mobile object 9, images in the surrounding are continuously taken by the image pickup devices 8. Each point P represents a position of the mobile object 9 for each preset time interval.

When the mobile object comes to P1, the control arithmetic unit 14 acquires a position data measured by the GPS position detecting device 7. At the same time, the image data taken by the image pickup device 8 is acquired, and the image data are stored in the data storage area 18 together with the position data. The control arithmetic unit 14 checks whether position data is inputted or not from the GPS position detecting device 7 for each point P. Depending on whether the position data is inputted or not from the GPS position detecting device 7, as described later, it is judged and selected whether the position measurement at each point P is the measurement by the position detecting sensor 3 or the measurement executed by the method of intersection and by the method of resection based on the image data. And then, the measurement is carried out.

Description will be given below on the acquisition of images of scenes on right side and of the obstacle 20, and on position measurement based on the images.

Figure 5:
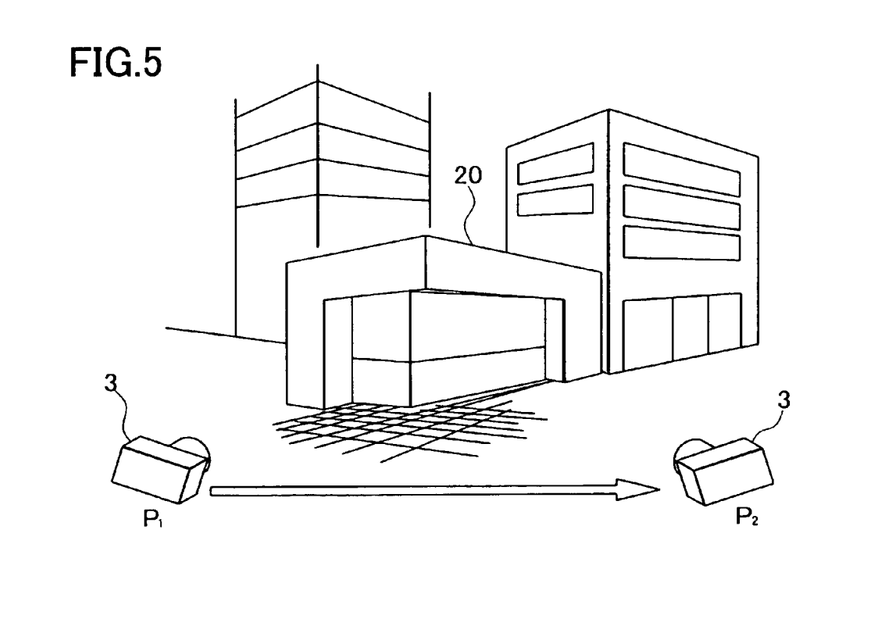
FIG. 5 is a perspective view showing a condition of image pickup in the position measuring device as described above.
Figure 6A:
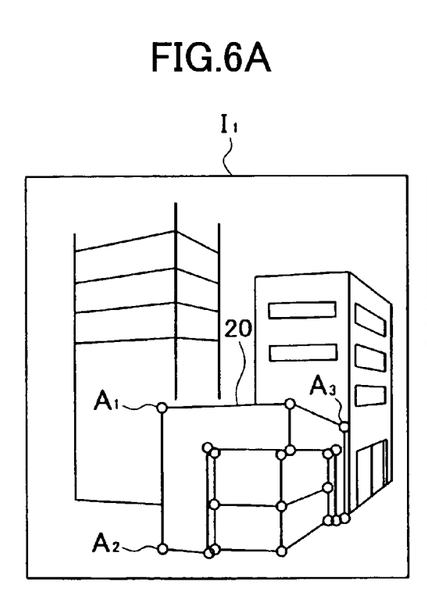
FIG. 6(A) and FIG. 6(B) each represents an image obtained.
Figure 6B:
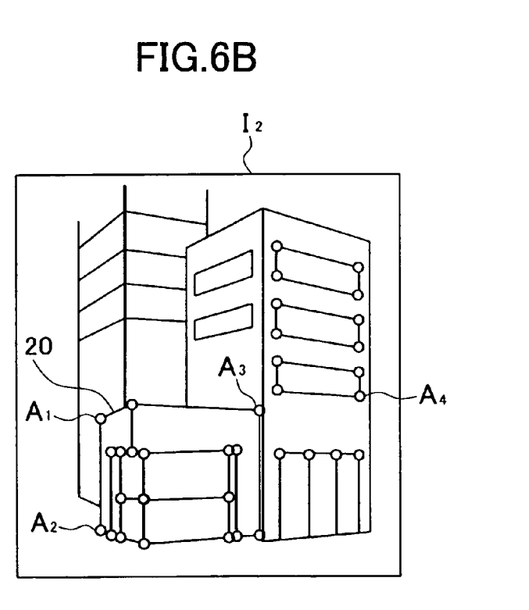

An image I1 taken at P1 in FIG. 5 is shown in FIG. 6(A), and an image I2 at P2 continuously taken while moving from P1 to P2 is shown in FIG. 6(B).

The control arithmetic unit 14 associates the image data I1 at P1 with the measured position data at P1 and both of associated data are stored in the data storage area 18. The control arithmetic unit 14 performs image processing such as edge processing on the image data I1 at P1 based on the image processing program, and corner points or cross-points, which are characteristic points in the image, are extracted as many as required as tracking points (A1, A2, A3 . . . ) (indicated by open circles in FIG. 6(A)) (Step 01). The tracking points are extracted so that these are dispersed all over the image.

Here, the azimuth from P1 at the center of the image data I1 is obtained from the azimuth detected by the azimuth sensor 10. Azimuth of each of the tracking points (A1, A2, A3, . . . ) from P1 is calculated from the position of pixel in the image data I1 (position on the image pickup element with respect to the image pickup center).

In the process from P1 to P2, images are continuously taken by the image pickup devices 8. Tracking points generated in each image are tracked between the adjacent images (Step 02).

Now, description will be given on the pursuit.

The tracking point is set up as an object of tracking. A position of the tracking point on the image pickup element is stored as a position of retrieval center. On the next image data acquired subsequently over time, the tracking point is retrieved over the preset retrieval range with the retrieval center stored as the center position. As described above, images are continuously taken during the movement, and deviation between the preceding image data and the next image data is very slight. The tracking point is present within the retrieval range of the next image data, and the tracking point in the next image data can be specified immediately. For the retrieval within the retrieval range, SSDA (Sequential Similarity Detection Algorithm) method or area correlation method, etc. is used.

Using the tracking point specified by the next image data as retrieval object, the tracking point of the preceding image data is checked by back-matching. When the tracking point obtained by the back-matching does not agree with the tracking point already obtained, the tracking point is deleted. By carrying out the back-matching, shade (occlusion) or obstacle can be avoided. When tracking points of 3 or more image data have been obtained, duplicated coordinate checking is executed by bundle adjustment calculation based on a plurality of images, and the tracking points with lower accuracy are deleted. By deleting the tracking points with lower accuracy, the accuracy to specify the tracking points is improved as a whole.

The preceding image data is compared with the next image data, and the tracking points as described above are sequentially retrieved in time series.

The extraction of the tracking points by image processing and the pursuit of the tracking points are continuously carried out regardless of whether the position data is inputted or not from the position detecting sensor 3 at each point P. The image data in the past, that the pursuit of the tracking points has been completed (image data taken between the points P), may be deleted for the purpose of reducing the storage amount.

Next, for P2, position measurement data is outputted from the position detecting sensor 3, and position measurement data and an image I2 taken at P2 are stored in the data storage area 18. Image processing is performed on the image I2, and the tracking points (A1, A2, A3 . . . ) are specified by tracking. Azimuth of each of the tracking points (A1, A2, A3 . . . ) relating to P2 at that moment is calculated based on azimuth detection in the image pickup direction by the azimuth sensor 10 and based on the position (field angle) of the image I2 at each of the tracking points (A1, A2, A3 . . . ) (see FIG. 7(A)).

Next, based on the position data of P1 and P2, which are known points, and based on azimuth angle of each of the tracking points (A1, A2, A3 . . . ) with respect to P1 and P2, 3-dimensional position data of each of the tracking points (A1, A2, A3 . . . ) are calculated by the method of intersection (Step 03).

As the result of calculation, the tracking points (A1, A2, A3, . . . ) are turned to the known points. The position data of the each of the tracking points (A1, A2, A3 . . . ) are associated with the image data of the image I1 and the image I2 and are stored in the data storage area 18. Regarding the tracking points as pass points (A1, A2, A3 . . . ), relative orientation of the image I1 and the image I2 is performed, and the image I1 and the image I2 are turned to images including 3-dimensional data (stereo images). Also, the image I1 and the image I2 and the image taken at the measuring point P are stored in the data storage area 18 together with 3-dimensional data. The measuring point is described later.

When the mobile object moves to P3, electric wave from the satellite is cut off by the obstacle 20, and the position measurement data by the position detecting sensor 3 is not inputted. When it is judged that there is no input from the position detecting sensor 3, the control arithmetic unit 14 switches over to the position measurement by the calculation according to the method of resection.

In the process up to P3, the image pickup by the image pickup devices 8 and the pursuit of the tracking points in the image data are continuously performed.

Figure 7A:
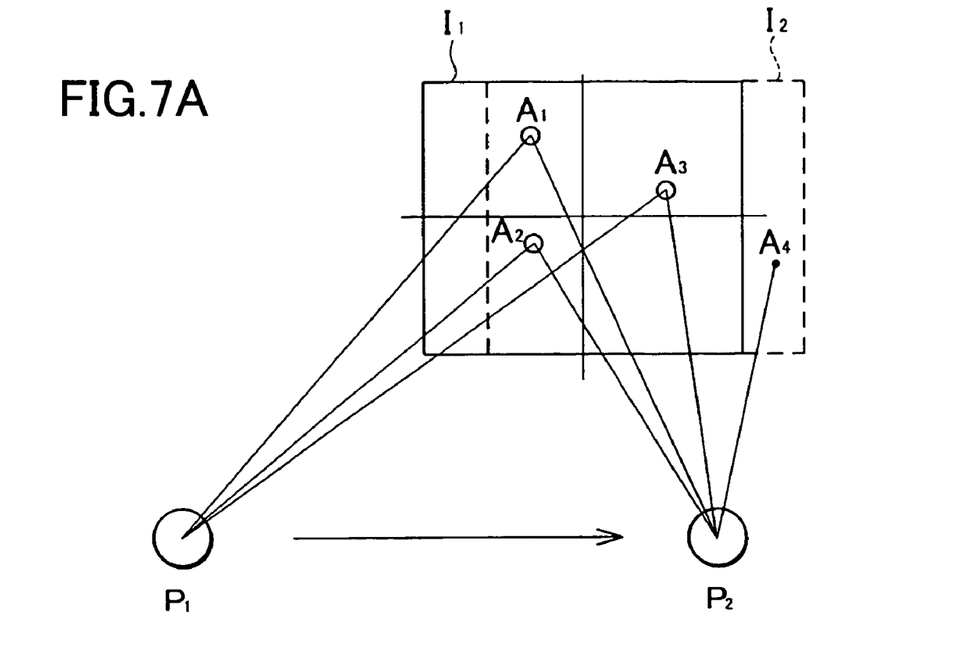
FIG. 7(A) is a drawing to explain position measurement at tracking points by the method of intersection on the image obtained.
Figure 7B:
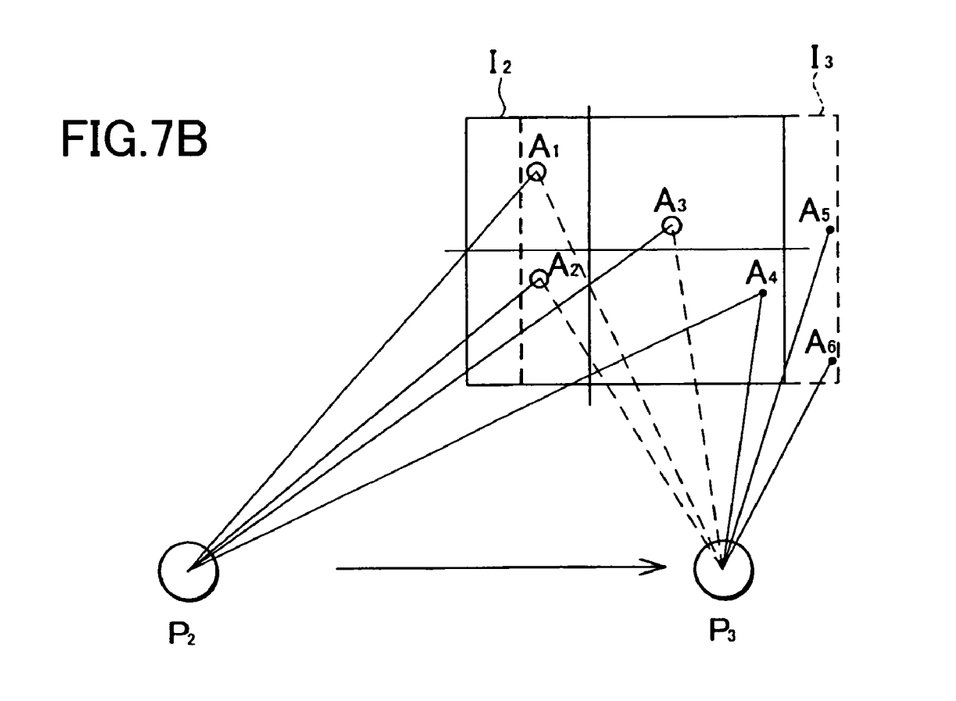
FIG. 7(B) is a drawing to explain position measurement at an image pickup point by the method of resection (backward intersection) based on the image obtained.
Figure 8:
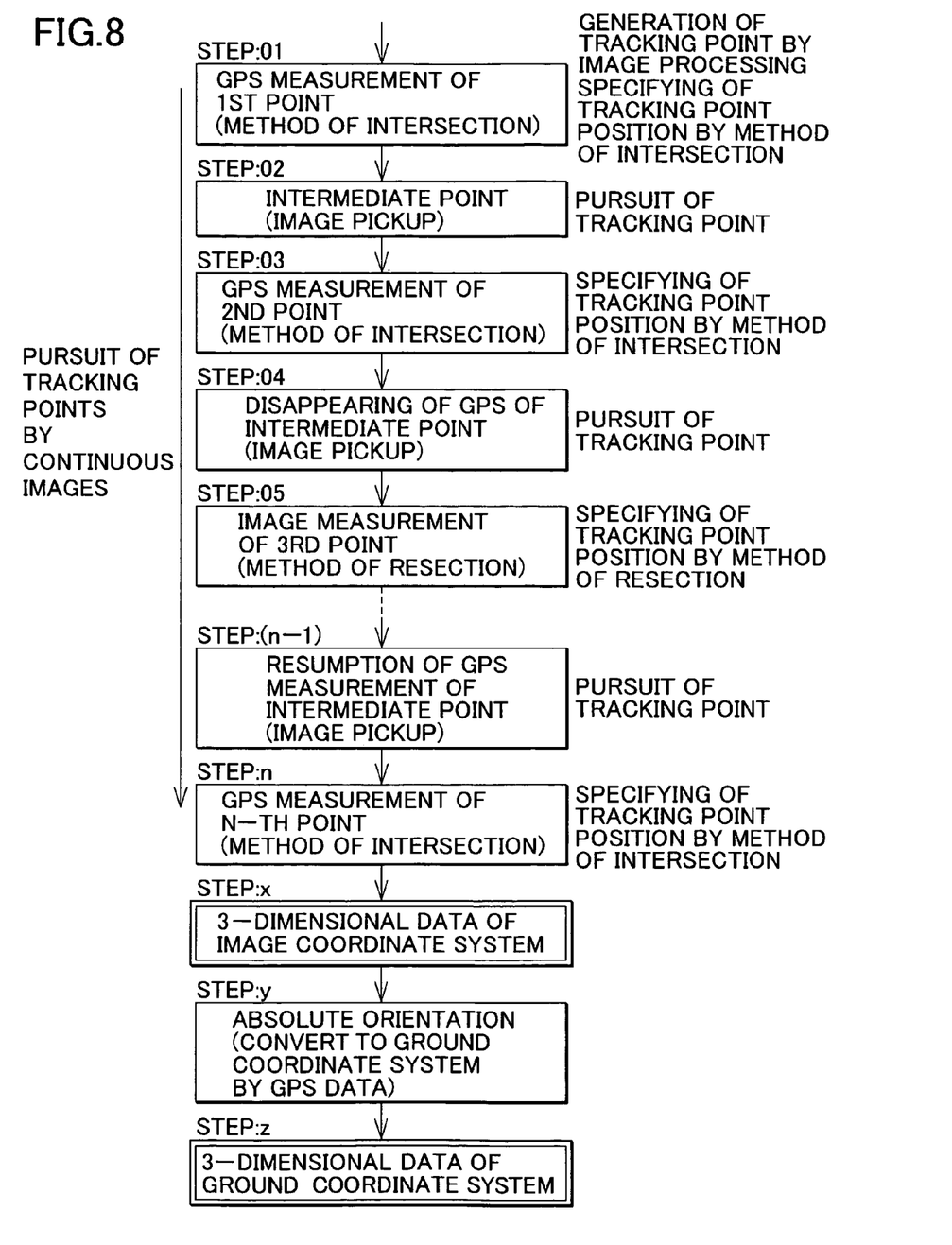
FIG. 8 is a flow chart to show operation of the embodiment of the present invention.

Specifically, based on the position data of each of the tracking points (A1, A2, A3, ...) already obtained and field angle of the tracking points (A1, A2, A3 ...) in the image I3 acquired at P3 and azimuth of P3 (azimuth and field angle in image pickup direction), position data of P3 is calculated by the method of resection (Step 05; see FIG. 7(B)).

When P1, P2, P3 ... and the mobile object 9 are moved and the image pickup range is shifted, new tracking points are generated one after another in the image taken. For instance, referring to FIG. 7(A) and FIG. 7(B), a tracking point A4 is generated in the image I2, and tracking point A5 and A6 are generated in the image I3. Pursuit is also performed on the newly generated tracking points (Step n-1). Further, position data are calculated and measured sequentially by the method of intersection.

By the method of resection, P3 is turned to a known point. Based on the position data of P3 and P2 and based on azimuth data with respect to the newly generated tracking points from P3 and P2, the positions of the newly generated tracking points are calculated by the method of intersection (Step n).

From the position data of the tracking points in the image, the position of Pn is calculated and measured by the method of resection. Further, from the data of P (n-1), which has been turned to a known point, and from the data of Pn, positions of the newly generated tracking points are calculated and measured by the method of intersection according to the image. Thus, even under condition that electric wave from the satellite is not obtained and the position measurement of P by the position detecting sensor 3 cannot be performed, the position measurement of P is continuously achievable by alternately performing the method of intersection and the method of resection.

Next, when the mobile object 9 reaches P6, the electric wave from the satellite can be received. The position of P6 is measured by the position detecting sensor 3. When the position data measured by the position detecting sensor 3 is inputted to the control arithmetic unit 14, the control arithmetic unit 14 judges that the position data has been inputted, and the calculation by the method of resection is stopped. The image data taken at P6 by the image pickup devices 8, the tracking points extracted from the image data, and azimuth data of the extracted tracking points are associated with the position data of P6 and are stored in the data storage area 18.

Accordingly, while the position data are inputted from the position detecting sensor 3, the results measured at the position detecting sensor 3 are adopted as the data of position measurement of P. When the position data from the position detecting sensor 3 are interrupted, the position data of P calculated by the method of intersection and the method of resection are adopted, and the position of P is continuously measured without being interrupted.

Based on the required number of tracking points pursued, relative orientation is performed at the tracking points as the pass points about the images acquired at two adjacent measuring points, e.g. P2 and P3, and the position data at the tracking points is turned to an image (stereo image) including 3-dimensional data. Then, position data and azimuth data of each of the pixels to constitute other images can be obtained by the image (stereo image), and calculation processing can be performed at higher speed (Step x). The stereo image at P obtained by relative orientation is stored in the data storage area 18.

Further, based on absolute data of the ground coordinate system of the GPS position detecting device 7 obtained at P1 and P2, 3-dimensional data of each of the images are sequentially converted to the data of the ground coordinate system (Step y).

The images taken at each of the measuring points can be turned to the images including 3-dimensional data of the ground coordinate system. Even a single GPS position detecting device 7 is used and when there is a portion in shade where electric wave from the satellite is interrupted in the middle of measurement operation, the position measurement is not interrupted, and a large amount of continuous 3-dimensional data and the image with 3-dimensional data can be acquired (Step z).

In the description as given above, images are taken on the obstacle on right side of the mobile object 9 and position measurement of P is performed. In case an adequate image cannot be acquired to obtain the tracking point from the obstacle on right side, the images to be acquired can be adequately selected in the stage of image processing, such that images are acquired from the obstacle on left side, depending on the conditions of the obstacle.

In the processing from Step x to Step z as given above, the image at the each measuring point P obtained in the processing up to Step n and the position data with respect to P of the image may be stored in the data storage area 18 for once. Then, the data may be transmitted to an external PC etc. via the communication control unit 16 and may be processed at the PC. When the processing from Step x to Step z is carried out by the external PC etc., the load on the control arithmetic unit 14 and the storage amount of the data storage area 18 can be reduced. As a result, more measuring points can be set up, and a large amount of the images with 3-dimensional data can be acquired.

Figure 9:
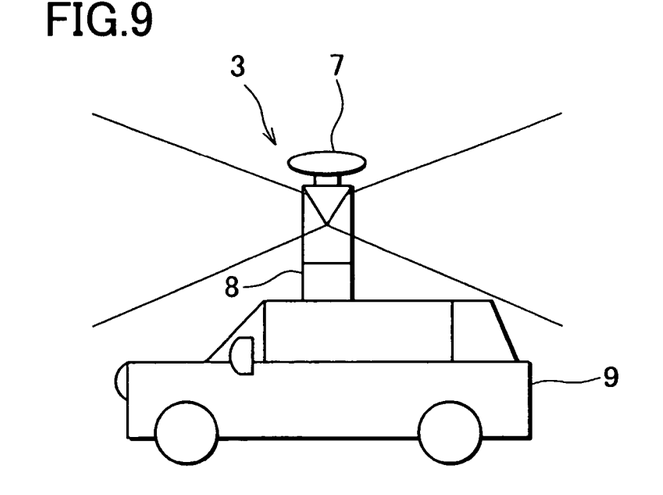
FIG. 9 is a drawing to explain another aspect of the position detecting sensor according to the present invention.
Figure 10:
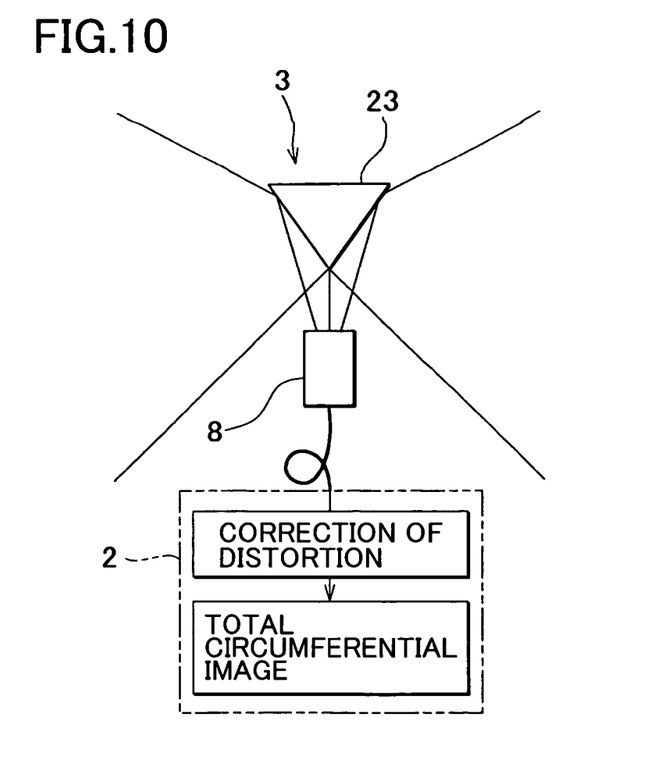
FIG. 10 is a schematical drawing of the position detecting sensor.

FIG. 9 and FIG. 10 each represents other conditions of the position detecting sensor 3.

The position detecting sensor 3 is installed on the mobile object 9, e.g. at a position with good outlook to the surrounding such as a position on roof of an automobile.

The position detecting sensor 3 is provided with an image pickup device 8 and with a conical mirror 23 with its central line aligned with optical axis of the image pickup device 8 so that the image can be taken via the conical mirror 23. Because images can be taken via the conical mirror 23, the image pickup device 8 can take images over total circumference. The image data are sent to the data processing preparation unit 2. The data storage area 18 has a distortion correction program. The control arithmetic unit 14 corrects the distortion of the image thus sent and turns the image to a total circumferential image without distortion, and this is stored in the data storage area 18 (see FIG. 3).

Also, for the case where total circumferential image is acquired by the conical mirror 23, i.e. by a total circumferential mirror, the procedure of the extraction of the tracking points and the pursuit of the tracking points etc. are the same as in the embodiment described above.

As the image pickup device 8, an image taking device to take an image over total circumference as commercially available, e.g. CCD camera, may be used. The image pickup device 8 (CCD camera) is installed under the conical mirror 23 and acquires images over the circumference as reflected by the conical mirror 23. The position of P where the image is acquired is obtained by the GPS position detecting device 7 mounted above or at a known distance from the conical mirror 23. The moving direction can be obtained from position coordinates of two points detected by the GPS position detecting device 7.

What is claimed is:

1. A 3-dimensional data preparing method, comprising:
   a first step of continuously taking digital images of scenes in a surrounding area when moving from a first point, which has known position data, via a second point, which has known position data, to a third point, which has unknown position data,
   a second step of generating tracking points from an image acquired at said first point, and sequentially specifying said tracking points by a pursuit of said tracking points generated on said continuously acquired images,
   a third step of obtaining 3-dimensional data of said tracking points based on a result of orientation of said tracking points at said first point and at said second point and from position data of said first point and said second point,
   a fourth step of sequentially obtaining a position of said third point, based on a result of orientation of one of said tracking points acquired at said third point and based on 3-dimensional position data of said tracking point,
   a fifth step of obtaining 3-dimensional position data of said image including said tracking point from a result of orientation of said images including said tracking points at said first point and at said second point and from said position data at said first point and at said second point, and
   a sixth step of sequentially obtaining 3-dimensional position data of said images including said tracking points from a result of orientation of the images including said tracking points at said second point and at said third point and from the position data at said second point and at said third point.

2. A 3-dimensional data preparing method according to claim 1, wherein position data are measured by a GPS position detecting device and said position data for at least said first point and said second point is obtained by said GPS position detecting device.

3. A 3-dimensional data preparing method according to claim 1, wherein position data of said tracking point is obtained from said known position data at said first point and at said second point by a method of intersection, and position data of said third point is obtained from 3-dimensional position data of said tracking point in said image by a method of resection.

4. A 3-dimensional data preparing method according to claim 1, wherein images in a plurality of directions are continuously acquired, and tracking points are generated in images at least in one direction.

5. A 3-dimensional data preparing device, comprising
   an image pickup device for continuously taking digital images of scenes in a surrounding area while moving from a first point, which has known position data, via a second point, which has known position data, to a third point, which has unknown position data,
   a direction sensor for detecting image pickup direction of said image pickup device, and
   a data processing preparation unit for generating tracking points from an image acquired at said first point, for sequentially specifying said tracking points from a pursuit of said tracking points generated in said images continuously acquired, for obtaining 3-dimensional position data of said tracking points from result of orientation of said tracking points at said first point and at said second point and from position data of said first point and said second point, for sequentially obtaining position data for said third point, from result of orientation of said tracking points acquired at said third point and from 3-dimensional position data of said tracking points, for obtaining 3-dimensional position data of an image including said tracking points from result of orientation of an image including tracking points at said first point and at said second point and from position data of said first point and said second point, and for sequentially obtaining 3-dimensional position data of an image including said tracking points from orientation result of images including said tracking points at said second point and said third point and from position data of said second point and said third point.

6. A 3-dimensional data preparing device according to claim 5, further comprising a GPS position detecting device, wherein said known position data of said first point and said second point are measured by said GPS position detecting device.

* * * * *